(12) United States Patent
Needham et al.

(10) Patent No.: US 6,839,769 B2
(45) Date of Patent: Jan. 4, 2005

(54) LIMITING REQUEST PROPAGATION IN A DISTRIBUTED FILE SYSTEM

(75) Inventors: Bradford H. Needham, North Plains, OR (US); Mark Lewis, La Grande, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 09/872,138

(22) Filed: May 31, 2001

(65) Prior Publication Data

US 2002/0194256 A1 Dec. 19, 2002

(51) Int. Cl.[7] .............................................. G06F 13/00
(52) U.S. Cl. ..................................................... 709/243
(58) Field of Search .............................. 709/200, 238, 709/243; 370/395, 397, 389, 238, 255

(56) References Cited

U.S. PATENT DOCUMENTS 6,130,889 A * 10/2000 Feldman et al. ............ 370/397
6,147,971 A * 11/2000 Rochberger et al. ........ 370/238

* cited by examiner

*Primary Examiner*—Robert B. Harrell
(74) *Attorney, Agent, or Firm*—Steven P. Skabrat

(57) ABSTRACT

Limiting propagation of requests for a file in a peer to peer media sharing system may be accomplished by sharing index information associated with the file from a first network node to a second network node in the peer to peer system, updating a distance counter in the index information by the second network node to denote the sharing of the index information about the file, and setting a request propagation limit in a request packet for requesting the file by the second network node to the distance counter.

30 Claims, 3 Drawing Sheets

LIMITING REQUEST PROPAGATION IN A DISTRIBUTED FILE SYSTEM

BACKGROUND

1. Field

The present invention relates generally to distributed file systems and protocols and, more specifically, to limiting request propagation in peer to peer media sharing systems.

2. Description

There are at least several peer to peer media sharing systems in current use on computer networks such as the Internet. Napster™ is a popular system that accepts requests for specified data at a central server and identifies to the requester where on the network the specified data may be located. Due to its centralized control scheme, the Napster system does not propagate requests through the network. Gnutella™ and FreeNet™, in contrast, are systems that propagate requests for data through the network from peer to peer in a decentralized manner.

One drawback to such a peer to peer system architecture is that requests may be propagated farther through the network than are necessary to satisfy the request. Each request that is propagated at least one "hop" from one network node to another network node that is not needed consumes valuable network resources unnecessarily. To combat this problem, network designers typically implement a "time-to-live" feature encoded in requests for data. For example, a constant time-to-live value is used in several network protocols, such as Internet Protocol (IP), to prevent swamping of the network by request packets. The time-to-live value is checked during propagation of request packets by each network node and the request is forwarded along to the next hop in the network only if the time-to-live value is not yet exceeded. When the time-to-live value is exceeded, the request is considered "dead" and no longer forwarded.

Gnutella and FreeNet both implement a time-to-live feature in their requests. However, neither of these systems have a way to intelligently limit the time-to-live value, because neither system can know the maximum distance in the network between the requester and the data being requested. In these systems, any network node is just as likely as any other network node to contain the data being requested. Thus, both of these systems set the time-to-live value to a relatively high constant value (e.g., 20 or 25 network hops). This results in many instances of wasted network bandwidth due to forwarding data requests unnecessarily.

BRIEF DESCRIPTION OF THE DRAWINGS

The features and advantages of the present invention will become apparent from the following detailed description of the present invention in which.

DETAILED DESCRIPTION

Figure 1:
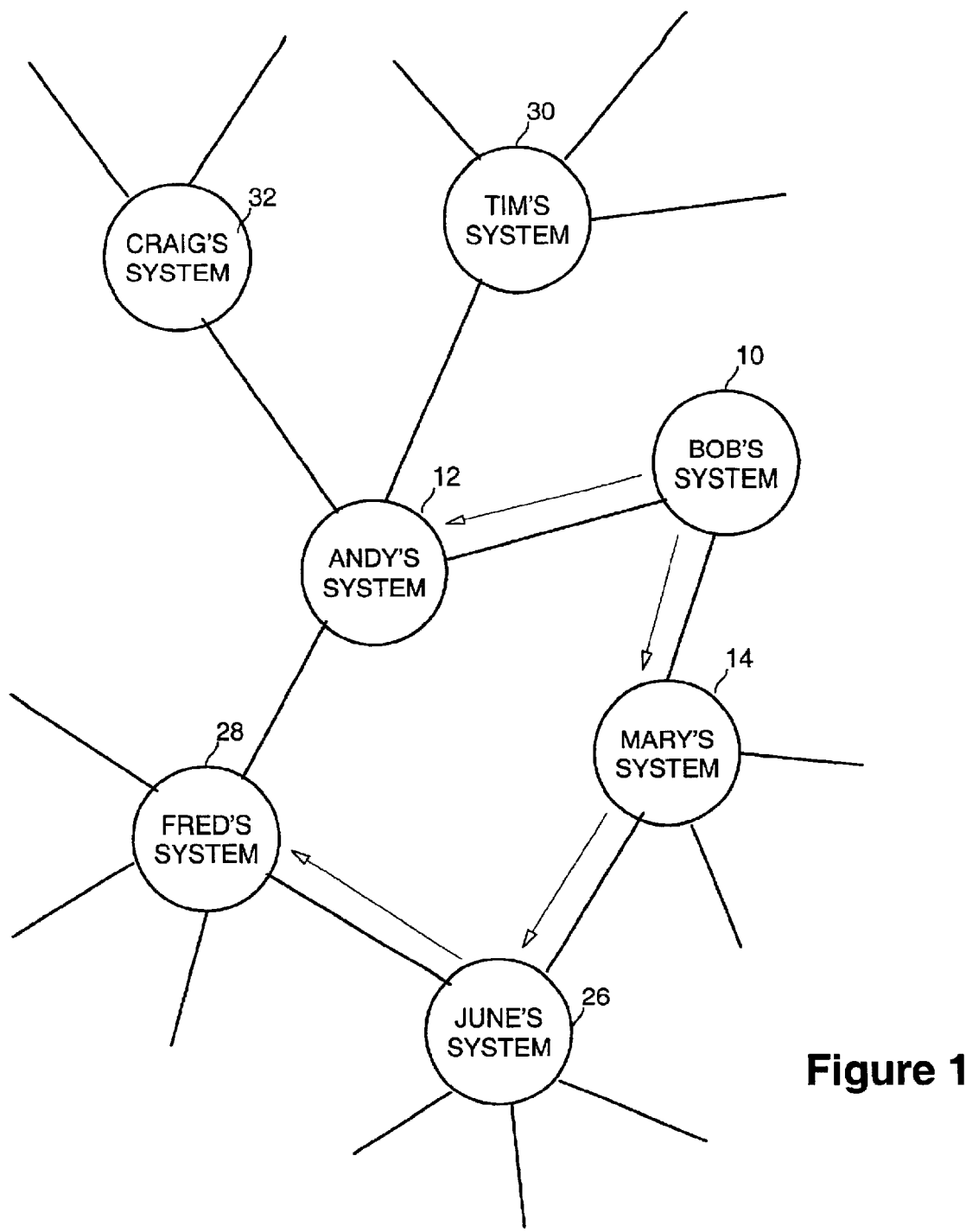
FIG. 1 is a diagram of an example portion of a network illustrating request propagation according to an embodiment of the present invention.

An embodiment of the present invention is a method of limiting request propagation in a distributed file system operating as a private peer to peer network. In one embodiment, the invention may be implemented in a peer to peer media sharing system. In typical peer to peer media sharing systems such as Napster and Gnutella, the file data being shared among users is professionally created and widely distributed data (e.g., music files encoded in the Moving Pictures Experts Group (MPEG) audio layer 3 (MP3) format, digital video clips encoded in various formats, etc.). That is, the data may be posted and made available in multiple copies and at multiple network nodes within the distributed network. In contrast, in embodiments of the present invention, the system may be designed to share individually created and narrowly distributed data. For example, the data being shared may be digital photographs or digital videos created by an individual for sharing only among his or her immediate social connections such as family and friends. The present invention takes advantage of the single point of creation of this type of data (and single point of posting the data) to limit the distance that requests for such data may be propagated through a private peer to peer network. In the present invention, a request for data need not be forwarded within the network any farther than the number of hops the data has already been shared within the network from the creator of the data. Thus, the limit on propagation of requests for data within the network may be automatically set as information about the availability of the data is forwarded among network nodes.

In embodiments of the present invention, index information about files may be communicated among nodes of the network separately from the file data. The index information may be selectively propagated through a public network only between nodes operated by people having social connections (e.g., friends and family), and the file data may be selectively propagated more narrowly in the network, again between friends and family. This in effect creates a private peer to peer network within a larger public network (such as the Internet, for example).

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention comprise a network of file storage systems, each system having index information about at least some of the files in the network, and each system having the ability to communicate with a subset of nodes in the network (for example, a user of a file storage system may communicate with his or her friends and family via their file storage systems). In various embodiments, a file storage system may be a personal computer (PC), an engineering workstation, a set top box, a personal digital assistant (PDA), a cellular phone, a mainframe computer, an Internet appliance, or any other device for storing and accessing file data via a communications network. A file storage system may also be referred to herein as a network node. Each network node may communicate with one or more other network nodes. The network may be a local area network (LAN), a wide area network (WAN), the Internet, or any other communications network. The files may store any digitally represented data, for example, audio data, video data, image data, or text data. In one embodiment, the file data comprises digital photographs and the file storage systems (nodes) are PCs coupled to one another via the Internet, although the invention is not limited in scope in this respect.

When a first user in the network wishes to make a file available for sharing with a second user such as a friend, the first user's system sends index information about the file (including a unique and "unguessable" identifier) to the second user's system. When the friend wishes to retrieve the file, the second user's system performs a local search on the second user's system to determine if the second user already has the file. If not, the second user's system makes a request for the selected file according to its identifier (e.g., "who has a copy of file 12345?") from his or her friends via their systems. If the immediate friends do not have the selected file, the friends' systems forward the request on to their friends within the network and so on. Requests may be made to various nodes of the network rather than directly to the creator of the file because a system (e.g., network node) that is "closer" (in the social sense) to the requester than the creator of the file may have a copy of the file and can forward it more easily or more efficiently, because the creator of the file may have deleted the file from the creator's system, or because the network topology may have changed.

FIG. 1 is a diagram of an example portion of a network illustrating request propagation according to an embodiment of the present invention. This example illustrates multiple network nodes interacting with each other in a privately organized peer to peer network based on social connections. In one embodiment, the private peer to peer network may be formed to communicate digital photographs amongst network members, with each digital photograph being stored in a file, although the data shared may be of any type or for any purpose. In this example, assume that Bob knows Mary and Andy, among others; Mary knows June and Bob, among others; June knows Fred and Mary, Fred knows Andy and June, and Andy knows Bob, Craig, Tim and Fred. Of course this example is merely for illustrative purposes and does not limit the scope of the invention. The circles shown in FIG. 1 represent the file storage systems (network nodes) of the people discussed in the example. Propagation of index information and a file request may be illustrated as follows.

Figure 2:
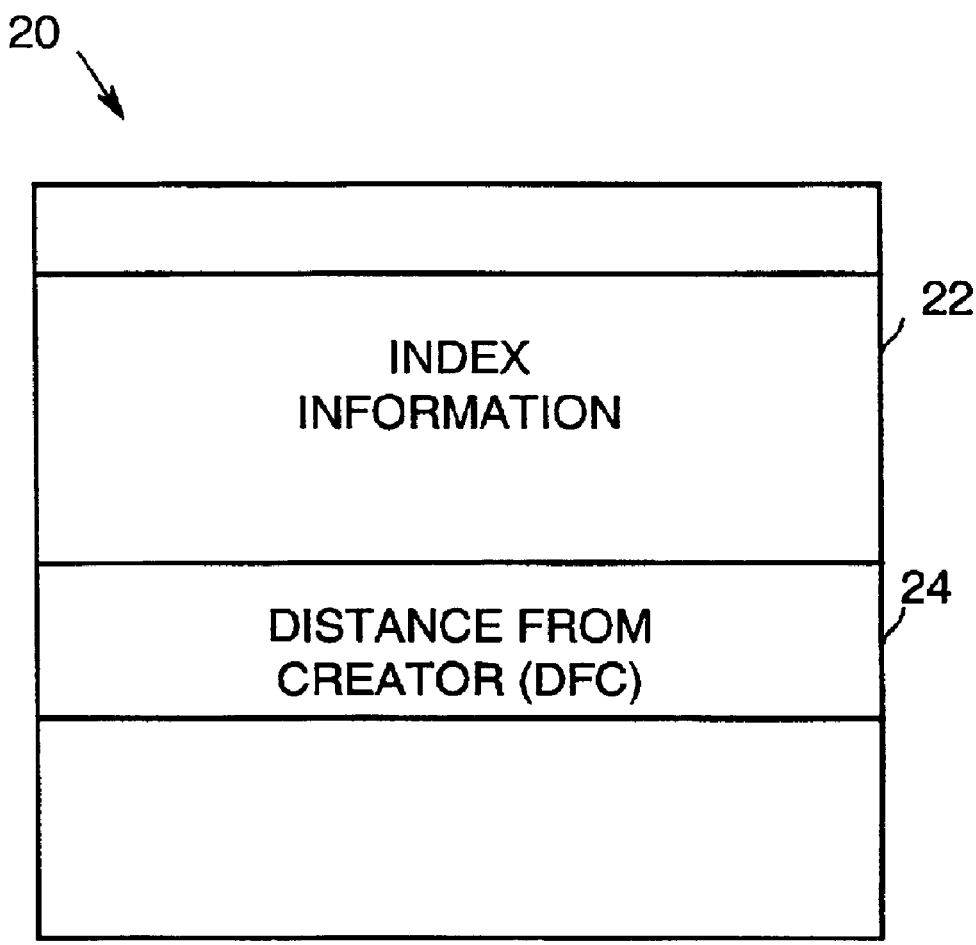
FIG. 2 is a diagram illustrating an example of an index information packet according to an embodiment of the present invention.

Bob 10 creates a digital photograph (or other data) in a file and shares index information about the photograph with his friends Andy 12 and Mary 14 (the arrows in FIG. 1 representing a sharing of index information) by sending each of them a copy of an index information packet. As part of creating the file storing the data (e.g., digital photograph data), Bob assigns the file a unique and very hard to guess identifier (for example, file #13572431234890), using any of several well known methods for generating globally unique and/or hard to guess identifiers. Identifiers for the files may be chosen to be very hard to guess in order to reduce the ability of a node to request copies of files for which the node has not received index information. FIG. 2 is a diagram illustrating an example of an index information packet according to an embodiment of the present invention. Index information packet 20 comprises at least an index information field 22 and a distance from creator field 24. The index information field may comprise data such as, but not limited to, a unique and very hard to guess photograph identifier, a caption or title, an image thumbnail, a creation date, a creator name, file size, format type, and other identifying information. Distance from creator (DFC) field 24 stores the number of hops within the network that the index information has been forwarded. The value of the DFC field may be loaded into a field of a request packet (not shown) for use in limiting propagation of the request packet. When the index information packet is created, the DFC field may be set to zero.

Returning to FIG. 1, in this example assume Mary 14 decides to share the index information for Bob's file #13572431234890 with her friend June 26, and June shares that index information with her friend Fred 28. When the index information is communicated from Bob to Andy in an index information packet, the distance from creator (DFC) field 24 may be incremented in the index information packet. Similar processing may be performed for the index information packet sent to Mary. When Mary shares her copy of the index information packet for the file with June, the DFC field may be incremented again, and when June shares this index information packet with Fred, the DFC field may be incremented yet again. Note that the copy of the index information packet received by Fred has a different DFC value than the copy of the index information packet received by Andy. In some embodiments, the index information may be encrypted using methods known in the art to provide added security to the system described herein. Meanwhile, based on the index information received from Bob 10, assume Andy 12 decides to retrieve a copy of Bob's photograph. Once the photograph is transferred from Bob's system to Andy's system, both Andy 12 and Bob 10 have a copy of the file containing the photograph.

In the example of FIG. 1, Bob's index information packet for Bob's photograph has a DFC field of 0, Andy's index information packet for the photograph has a DFC field of 1 (reflecting the transfer of the index information from Bob to Andy), and Fred's index information packet for the same photograph has a DFC field of 3 (because that index came through June, Mary, and Bob).

Now assume Fred 28 decides to retrieve a copy of Bob's photograph from somewhere in the network. Assume also that Fred doesn't necessarily care which network node he gets the file from. Fred's system 28 sends a request packet to Fred's friends (e.g., the network nodes immediately coupled to Fred's network node) in the private peer to peer network asking, in essence, "Fred wants to know whether you have a copy of file #13572431234890." Fred's system knows the unique identifier for the file containing the photograph by reading the index information associated with the file. Fred's system sets a request propagation limit in the request packet to the value of the distance from creator field of Fred's copy of the index information packet. In this example, this DFC value is 3. Fred's request packet goes initially, in this example, to Andy 12 and June 26. Since Andy has obtained a copy of the file, Andy replies to Fred's system that Andy's system has a copy. The request packet also concurrently propagates along "friendship" lines through June 26 and Mary 14 to Bob 10, who also replies to Fred's system that Bob's system has a copy of the requested file. Fred's system may now choose which network node to retrieve the file from, based on one or more factors such as distance through the network, available bandwidth, anticipated response time, or a variety of other factors. In this example, Fred's system may choose to retrieve the file from Andy's system 12. Fred's system sends a request to Andy's system to send a copy of selected file (e.g., #13572431234890). Andy's system then sends a copy of the file containing Bob's photograph to Fred.

Since the requester of the file typically does not know how close or distant a copy of the requested file is within the network, generally a request packet may be propagated widely throughout the network, wasting precious network bandwidth. However, in some embodiments of the present invention, each network node that receives a request packet checks the request propagation limit field in the request packet (previously set to the distance from creator value during generation of the request packet by the requesting node) and compares the limit to the number of hops that the request packet has already traveled within the network (represented by a propagation counter in the request packet). If the request propagation limit has been reached, then the network node considers the request packet to be "dead" and does not forward the request packet onward. This ensures that the request packet only travels as far as it has to within the network, thereby saving network bandwidth. In other embodiments, the request propagation limit may be decremented each time the request packet is forwarded, and the request packet may be forwarded only when the request propagation limit is non-zero. In this example, when Fred makes his request, the request packet travels to June and her friends, Mary and her friends, and stops at Bob because Bob is at a distance of three hops from Fred (the request propagation limit field in the request packet having been set to three, the DFC field value for Fred's index information packet). The request also travels from Fred to Andy and his friends, and to Tim 30 and Craig 32 and their friends, and then stops because the limit distance of three hops from Fred has been reached.

The present invention thus sets the request propagation limit for a request for a certain file in a peer to peer network based on the extent that index information about the file data has been shared throughout the network, rather than to a preset limit based on the overall network topology or a global design decision. The present invention is designed for sharing personally created data rather than professionally created data, hence, the network nodes can themselves determine the maximum distance between the creator of a file and the potential consumer of the file. Embodiments of the present invention limit the "time-to-live" of request packets based on the maximum distance between the creator of the data and the requesting node, dramatically reducing the network bandwidth consumed by requests. Because the present invention sends index information separately from file data, the maximum distance to a potentially interesting file may be estimated as the index information is propagated. This maximum distance may then be used as the request propagation limit for request packets sent to identify where in the network the requested file resides.

Figure 3:
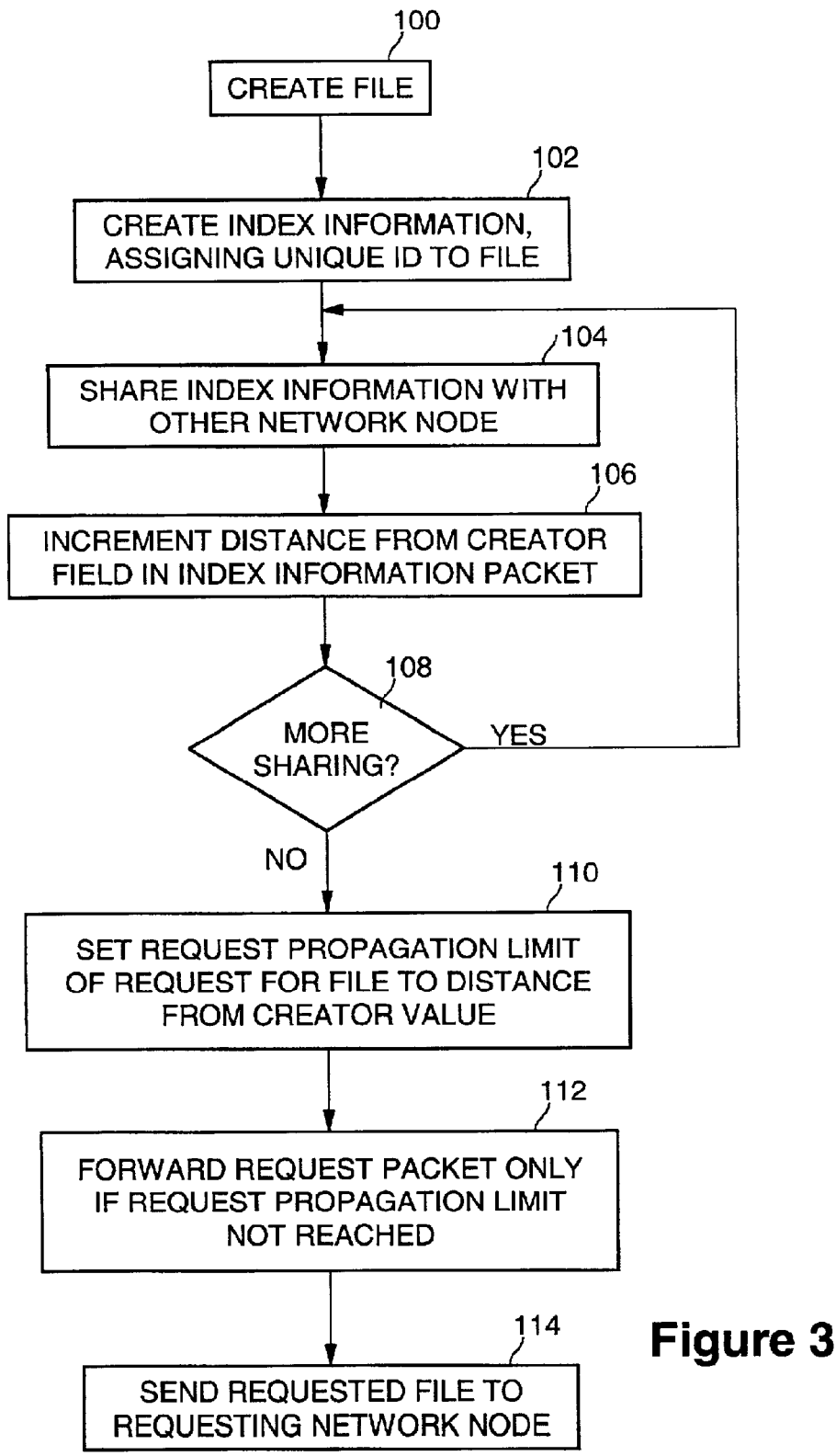
FIG. 3 is a flow diagram of request propagation limit processing according to an embodiment of the present invention.

FIG. 3 is a flow diagram of request propagation limit processing according to an embodiment of the present invention. At block 100, a first network node within a peer to peer network creates a file containing data. At block 102, the first network node creates index information associated with the created file. The index information may assign a unique and hard to guess identifier to the file. At block 104, a network node (initially the first network node) shares the index information with another network node (e.g., a second node) by sending an index information packet to the other node. At block 106, the distance from creator (DFC) field or distance counter in the index information packet may be incremented or otherwise updated by the second, receiving node. At block 108, if further sharing of the index information occurs, processing continues back at block 104. Thus, the index information may be propagated through the network, with the DFC field being updated by each receiving node. Otherwise, at block 110, at any network node having the index information and requesting the file, the request propagation limit in a request packet for the file may be set to the DFC value in the associated index information. The requesting network node may be any node that has received the index information. The requesting node then sends the request packet to one or more other network nodes in the requesting node's social network (e.g., private peer to peer network). Subsequently, at block 112, any network node receiving the request packet forwards the request packet to another network node in its social network only if the request propagation limit has not been reached. If the limit has not been reached, in one embodiment a current number of hops or propagation counter may be incremented or otherwise updated in the request packet prior to forwarding the request packet. In another embodiment, the request propagation limit may be decremented each time the request packet is forwarded, and the request packet may be forwarded only when the request propagation limit is nonzero. If the limit has been reached, the request packet is considered to be "dead" and not forwarded. At block 114, a network node having the file and receiving the request packet may subsequently transfer the requested file to a requesting network node.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable storage medium, configured with a program, where the storage medium so configured causes a machine to operate in a specific manner. Other embodiments are within the scope of the following claims.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of limiting propagation of requests for a file comprising:

sharing index information associated with the file from a first network node to a second network node in a peer to peer system;

updating a distance counter in the index information by the second network node; and setting a request propagation limit in a request packet for requesting the file by the second network node to the distance counter.

2. The method of claim 1, further comprising creating the file and creating the index information by a single network node.

3. The method of claim 2, further comprising assigning a globally unique identifier to the file by the first network node.

4. The method of claim 1, wherein the distance counter represents a maximum number of hops between network nodes from a creator of the file to a requester of the file within the peer to peer system.

5. The method of claim 1, further comprising sharing the index information from the second network node to a third network node, updating the distance counter by the third network node, and setting the request propagation limit by the third network node.

6. The method of claim 1, further comprising receiving the request packet by a network node and forwarding the request packet to another network node only when the request propagation limit is not reached.

7. The method of claim 1, wherein the index information is shared between the first network node and the second network node only when a user operating the first network node has a social connection to a user operating the second network node.

8. An article comprising: a storage medium having a plurality of machine readable instructions, wherein when the instructions are executed by a processor, the instructions provide for limiting propagation of requests for a file by sharing index information associated with the file from a first network node to a second network node in a peer to peer system; updating a distance counter in the index information by the second network node; and setting a request propagation limit in a request packet for requesting the file by the second network node to the distance counter.

9. The article of claim 8, further comprising instructions for creating the file and creating the index information by a single network node.

10. The article of claim 9, further comprising instructions for assigning a globally unique identifier to the file by the first network node.

11. The article of claim 8, wherein the distance counter represents a maximum number of hops between network nodes from a creator of the file to a requester of the file within the peer to peer system.

12. The article of claim 8, further comprising instructions for sharing the index information from the second network node to a third network node, updating the distance counter by the third network node, and setting the request propagation limit by the third network node.

13. The article of claim 8, further comprising instructions for receiving the request packet by a network node and forwarding the request packet to another network node only when the request propagation limit is not reached.

14. A method of operating a plurality of network nodes to limit propagation of requests for a file in a peer to peer system comprising:

creating a file and assigning a globally unique identifier to the file by a first network node;

sharing index information associated with the file by the first network node with a second network node in the peer to peer system;

updating a distance counter in the index information by the second network node to denote the sharing of the index information;

setting a request propagation limit in a request packet for requesting the file by the second network node to the distance counter; and forwarding the request packet to another network node only when a propagation counter for the request packet does not exceed the request propagation limit.

15. The method of claim 14, further comprising updating the propagation counter when a network node forwards the request packet to another network node.

16. The method of claim 14, further comprising sending the requested file to the second network node.

17. The method of claim 14, further comprising repeating the sharing and updating steps for a plurality of network nodes.

18. The method of claim 14, wherein sharing the index information comprises sharing the index information only among network nodes operated by users with a social connection to each other.

19. The method of claim 14, further comprising encrypting the index information prior to sharing the index information.

20. An article comprising: a storage medium having a plurality of machine readable instructions, wherein when the instructions are executed by a processor, the instructions provide for operating a plurality of network nodes to limit propagation of requests for a file in a peer to peer system by creating a file and assigning a globally unique identifier to the file by a first network node; sharing index information associated with the file by the first network node with a second network node in the peer to peer system; updating a distance counter in the index information by the second network node to denote the sharing of the index information; setting a request propagation limit in a request packet for requesting the file by the second network node to the distance counter; and forwarding the request packet to another network node only when a propagation counter for the request packet does not exceed the request propagation limit.

21. The article of claim 20, further comprising instructions for updating the propagation counter when a network node forwards the request packet to another network node.

22. The article of claim 20, further comprising instructions for sending the requested file to the second network node.

23. The article of claim 20, further comprising instructions for repeating the sharing and updating steps for a plurality of network nodes.

24. The article of claim 20, wherein instructions for sharing the index information comprises instructions for sharing the index information only among network nodes operated by users with a social connection to each other.

25. The article of claim 20, further comprising instructions for encrypting the index information prior to sharing the index information.

26. A peer to peer file sharing system comprising:

a plurality of network nodes, wherein each network node creates files and assigns a globally unique identifier to each created file, shares index information associated with each of the created files with other network nodes, updates a distance counter in the index information to denote sharing of the index information, sets a request propagation limit in a request packet for requesting a file to the distance counter; and forwards the request packet to another network node only when the request propagation limit is not reached.

27. The peer to peer system of claim 26, wherein the files store at least one of digital photographs, digital videos, digital audio data, image data, or text data.

28. The peer to peer system of claim 26, wherein the network nodes of the peer to peer system are operated by users having a social connection.

29. The peer to peer system of claim 26, wherein the distance counter represents a maximum number of hops between network nodes from a creator of a file to a requester of the file within the peer to peer system.

30. The peer to peer system of claim 26, wherein only one network node creates a selected file and creates index information for the selected file.

\* \* \* \* \*